United States Patent [19]

Pierret et al.

[11] Patent Number: 5,323,101
[45] Date of Patent: Jun. 21, 1994

[54] REGULATOR CIRCUIT FOR REGULATING THE OUTPUT VOLTAGE OF AN ALTERNATOR, IN PARTICULAR IN A MOTOR VEHICLE

[75] Inventors: Jean-Marie Pierret, Paris; Raymond Rechdan, Saint Maurice, both of France

[73] Assignee: Valeo Equipements Electriques Moteur, Creteil, France

[21] Appl. No.: 54,046

[22] Filed: Apr. 27, 1993

[30] Foreign Application Priority Data

May 5, 1992 [FR] France .................. 92 05513

[51] Int. Cl.⁵ .......... H02J 7/14; H02P 9/04; F02D 41/16
[52] U.S. Cl. .................. 322/28; 322/29; 322/73; 123/339
[58] Field of Search .............. 322/28, 29, 73; 123/339

[56] References Cited

U.S. PATENT DOCUMENTS

| | | | |
|---|---|---|---|
| 4,368,417 | 1/1983 | Matsuyama | 322/29 |
| 4,520,272 | 5/1985 | Danno et al. | 123/339 X |
| 4,555,657 | 11/1985 | Kato et al. | 322/28 X |
| 4,633,093 | 12/1986 | Otobe et al. | 123/339 X |
| 4,649,878 | 3/1987 | Otobe et al. | 123/339 |
| 4,651,081 | 3/1987 | Nishimura et al. | 322/29 X |
| 4,689,545 | 8/1987 | Komurasaki et al. | 322/28 X |
| 4,789,817 | 12/1988 | Asakura et al. | 322/28 |
| 4,794,898 | 1/1989 | Kato | 123/339 |

FOREIGN PATENT DOCUMENTS

| | | |
|---|---|---|
| 0201243 | 4/1986 | European Pat. Off. . |
| 0438884 | 12/1990 | European Pat. Off. . |
| 3036971 | 5/1982 | Fed. Rep. of Germany . |

Primary Examiner—R. J. Hickey

[57] ABSTRACT

A regulator circuit for regulating the voltage delivered by an alternator for charging an associated battery, the alternator including an excitation winding and the regulator circuit controlling the current flowing through said excitation winding by switching between a first state in which excitation current increases and a second state in which excitation current decreases, said current being controlled as a function of a voltage value delivered by said alternator, wherein the circuit comprises:

(a) detection means for determining whether the time during which the regulator circuit is in its first state is greater than a threshold time;
(b) means for generating a speed signal representative of the speed of rotation of the alternator;
(c) means responsive to a signal provided by the detection means to periodically compare said speed signal with a predetermined relationship establishing admissible decrease in the speed of rotation of the alternator as a function of time; and
(d) means for temporarily switching said regulator circuit to the second state when said speed of rotation becomes less than an admissible value as determined by said relationship.

The invention also provides a method of regulation.

7 Claims, 3 Drawing Sheets

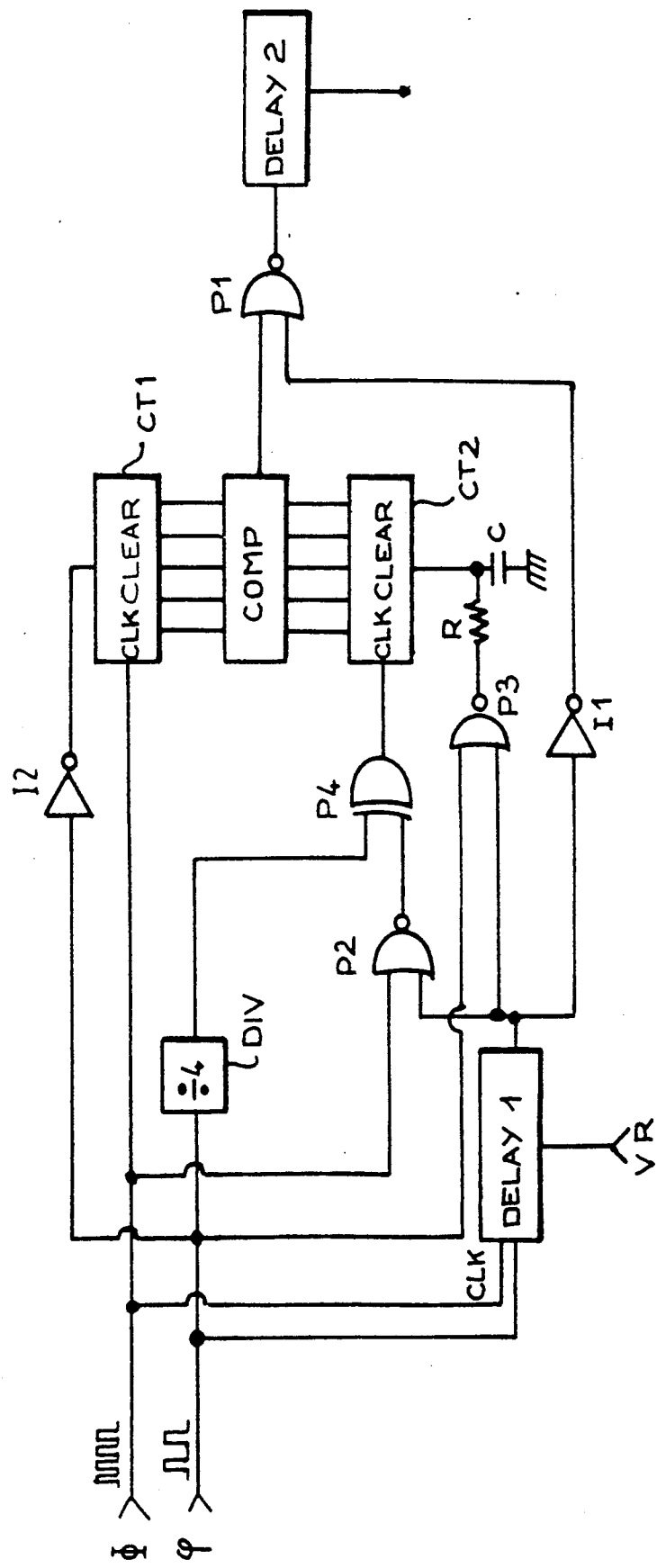
FIG_3

REGULATOR CIRCUIT FOR REGULATING THE OUTPUT VOLTAGE OF AN ALTERNATOR, IN PARTICULAR IN A MOTOR VEHICLE

The present invention relates in general to a regulator circuit for regulating the voltage delivered by an alternator, in particular in a motor vehicle.

BACKGROUND OF THE INVENTION

In an electric circuit of a motor vehicle including a battery that is charged by an alternator driven by the vehicle engine, when heavy current loads are applied while the engine is idling or going slowly, the mechanical load which is then suddenly applied to the engine by the alternator runs the risk of disturbing rotation of said engine, and may even cause it to stall.

This problem is becoming more severe as present day motor vehicles are being fitted with more and more electrical accessories (electrically-driven controls and servo-controls, heating, air conditioning, etc. ...) that draw large amounts of current.

A known solution to this problem, that occurs readily to the person skilled in the art, consists in immediately increasing the idling speed of the engine as soon as heavy current demand is observed, with this being done by suitably controlling the carburetor or the injection system to enable the engine to cope with the sudden increase in mechanical load applied to it by the alternator.

Unfortunately, that solution is quite undesirable since it makes designing control of the engine admission system much more complicated; in addition, it requires a functional link between two portions of the vehicle, namely engine admission and the alternator/battery circuit, which may have design origins that are completely different. The design process is thus made less flexible.

OBJECT AND BRIEF SUMMARY OF THE INVENTION

The present invention seeks to mitigate the above drawbacks of the state of the art.

To this end, the present invention provides a regulator circuit for regulating the voltage delivered by an alternator for charging an associated battery, the alternator including an excitation winding and the regulator circuit controlling the current flowing through said excitation winding by switching between a first state in which excitation current increases and a second state in which excitation current decreases, said current being controlled as a function of a voltage value delivered by said alternator, wherein the circuit comprises:

(a) detection means for determining whether the time during which the regulator circuit is in its first state is greater than a threshold time;

(b) means for generating a speed signal representative of the speed of rotation of the alternator;

(c) means responsive to a signal provided by the detection means to periodically compare said speed signal with a predetermined relationship establishing admissible decrease in the speed of rotation of the alternator as a function of time; and (d) means for temporarily switching said regulator circuit to the second state when said speed of rotation becomes less than an admissible value as determined by said relationship.

In a second aspect, the present invention provides a method of regulating the voltage delivered by an alternator for charging an associated battery, the alternator including an excitation winding and being associated with a regulator circuit that controls the current through said excitation winding by switching between a first state during which excitation current increases and a second state during which excitation current decreases, the current being controlled as a function of a voltage value delivered by said alternator, wherein the method comprises the following steps:

(a) determining whether a length of time during which the regulator circuit has been in the first state is greater than a threshold duration;

(b) as soon as the threshold duration is exceeded, periodically generating a speed signal representative of the speed of rotation of the alternator, and then periodically comparing said speed signal with a predetermined relationship establishing an admissible decrease in the speed of rotation of the alternator as a function of time; and (c) temporarily switching said regulator circuit to its second state when the said speed of rotation becomes less than an admissible value determined by said relationship.

BRIEF DESCRIPTION OF THE DRAWINGS

Other aspects, objects, and advantages of the present invention appear more clearly on reading the following detailed description of a preferred embodiment thereof, given by way of example and made with reference to the accompanying drawings, in which:

FIG. 3 is a block diagram of a portion of the regulator circuit of the invention.

MORE DETAILED DESCRIPTION

To begin with, it should be observed that the principle on which the present invention is based consists in periodically forcing the excitation current of the alternator to be reduced whenever it is observed that the speed of rotation of the alternator is decreasing more quickly than a pre-established decrease relationship. In this way, since excitation is reduced, the mechanical load exerted by the alternator on the engine remains within acceptable limits, for the purpose of avoiding any stalling or hiccuping of the engine.

It is preferable for this acceptable pre-established decrease relationship to have a slope that varies proportionally with the speed of the engine between slow (idling) and faster.

Figure 1:
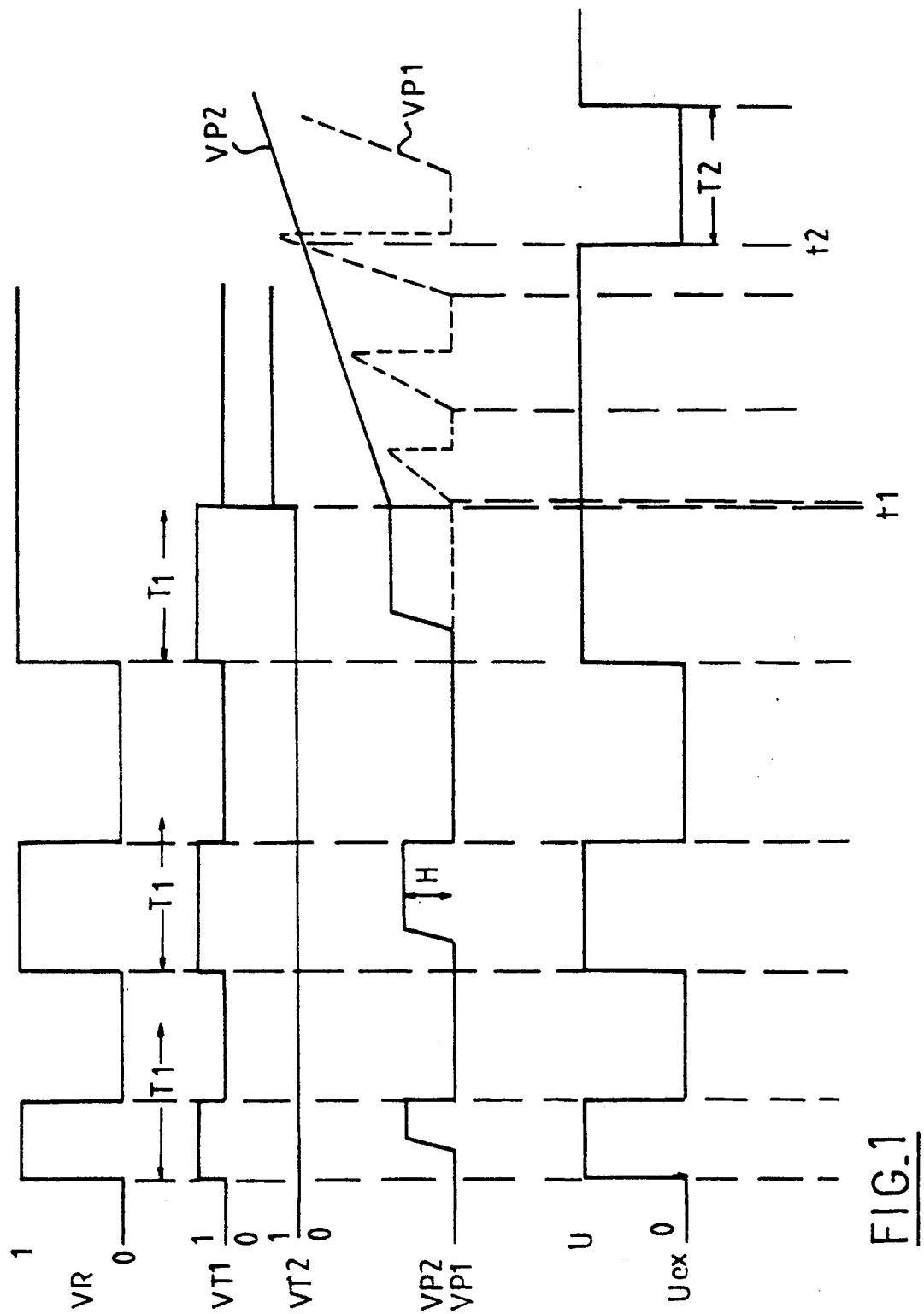
FIG. 1 is a timing diagram showing how a regulator circuit of the invention operates.

With reference now to FIG. 1, VR represents a logic signal which has a high logic level (level "1") when the voltage UB+ at the terminals of the battery is less than a reference voltage UF, and which has a low level (level "0") otherwise. This signal is derived without difficulty in a conventional regulator circuit that includes comparison means for comparing UB+ with Uref. It high logic level corresponds to a switch in series with the excitation winding of the alternator being closed so as to cause the excitation current to increase, and its low logic level corresponds, on the contrary, to said switch being open and to a decrease in the excitation current.

The voltage VT1 in FIG. 1 may be obtained, for example, from an appropriate timing circuit. It switches from a low logic level to a high logic level each time there is a rising front in the voltage VR. It returns to a low logic level:

a) either when there is a falling front in the voltage VR, if said front appears before a predetermined time delay T1 has elapsed, e.g. about 30 milliseconds;

b) or else at the end of said time delay if no falling front has occurred by then in VR.

The voltage VT2 comes from the timing circuit. It switches from a low logic level to a high logic level only when the voltage VT1 has returned to a low logic level in situation b) above. In other words, when raised to the high level, the voltage VT2 indicates that the regulator circuit has remained in a state of increasing excitation current for a length of time that is greater than the above-mentioned time delay, i.e. the regulator circuit is coming close to "full-field" conditions (maximum excitation).

The signal VP1 in FIG. 1 presents pulses at regular intervals and of height H that is proportional to the period of rotation of the alternator.

This signal, which is advantageously in the form of an N-bit digital word, is obtained for example by a counter that measures the period of the phase signal delivered by the alternator, which period is inversely proportional to the speed of rotation of the alternator.

In addition, the signal VP2 of FIG. 1 shows an acceptable relationship for change in the period of rotation, which in the present case is in the form of a straight line of positive slope running from the present value of VP1, said relationship being established as soon as the voltage VT2 has a rising front, at the instant marked t1.

As from said instant t1, the pulses of the signal VP1 are produced at regular intervals, and each pulse is verified to ascertain whether or not it exceeds the relationship as determined by VP2.

In other words, the relationship VP2 sets an admissible relationship for period increase, i.e. for reduction in the speed of rotation of the alternator, and a signal is produced as soon as the real period represented by VP1 exceeds the maximum allowable period as set at the instant under consideration by the relationship VP2, i.e. as soon as the speed of rotation of the alternator becomes less than the minimum allowable speed at the instant under consideration.

The voltage Uex designates the excitation voltage applied to the excitation winding of the alternator. Up to above-mentioned instant t1, Uex has a value which is a function of the logic level of the signal VR. When VR is at the high level, Uex takes a value U close to the battery voltage, and causes an increase in the excitation current. Conversely, when VR is at the low level, Uex is close to zero (marked "0" for simplification purposes) and the excitation current decreases.

After instant t1, when the voltage Uex ought to remain at the high level, given the state of the voltage VR, said voltage Uex is forced to zero as soon as it is observed that the signal VP1 exceeds the signal VP2, which takes place at instant t2 in the timing diagram of FIG. 1.

This forcing of the voltage Uex to zero is performed during a determined length of time T2, e.g. about 5 milliseconds, and fixed by a suitable delay circuit, for example.

The reduction thus caused in the excitation normally causes the mechanical load exerted by the alternator on the engine to be reduced, such that the speed of rotation of the alternator will decrease more slowly. This temporary reduction in excitation therefore causes the period of rotation to increase more slowly, with the object being to do this in such a manner that said period remains beneath the relationship set by VP2. During the following pulse in the signal VP1, it is again determined whether or not said pulse exceeds the signal VP2, and the excitation voltage is again forced to zero, if necessary.

It should be observed here that should the reduction in the speed of rotation of the alternator be due to some reason other than an increase in the mechanical load exerted by the alternator on the engine, i.e. if the above-described mechanism turns out to have no effect on the speed of rotation, then it is possible to provide suitable detection means for bringing the alternator back to full-field conditions by eliminating the effect on excitation produced by comparing speeds.

Figure 2:
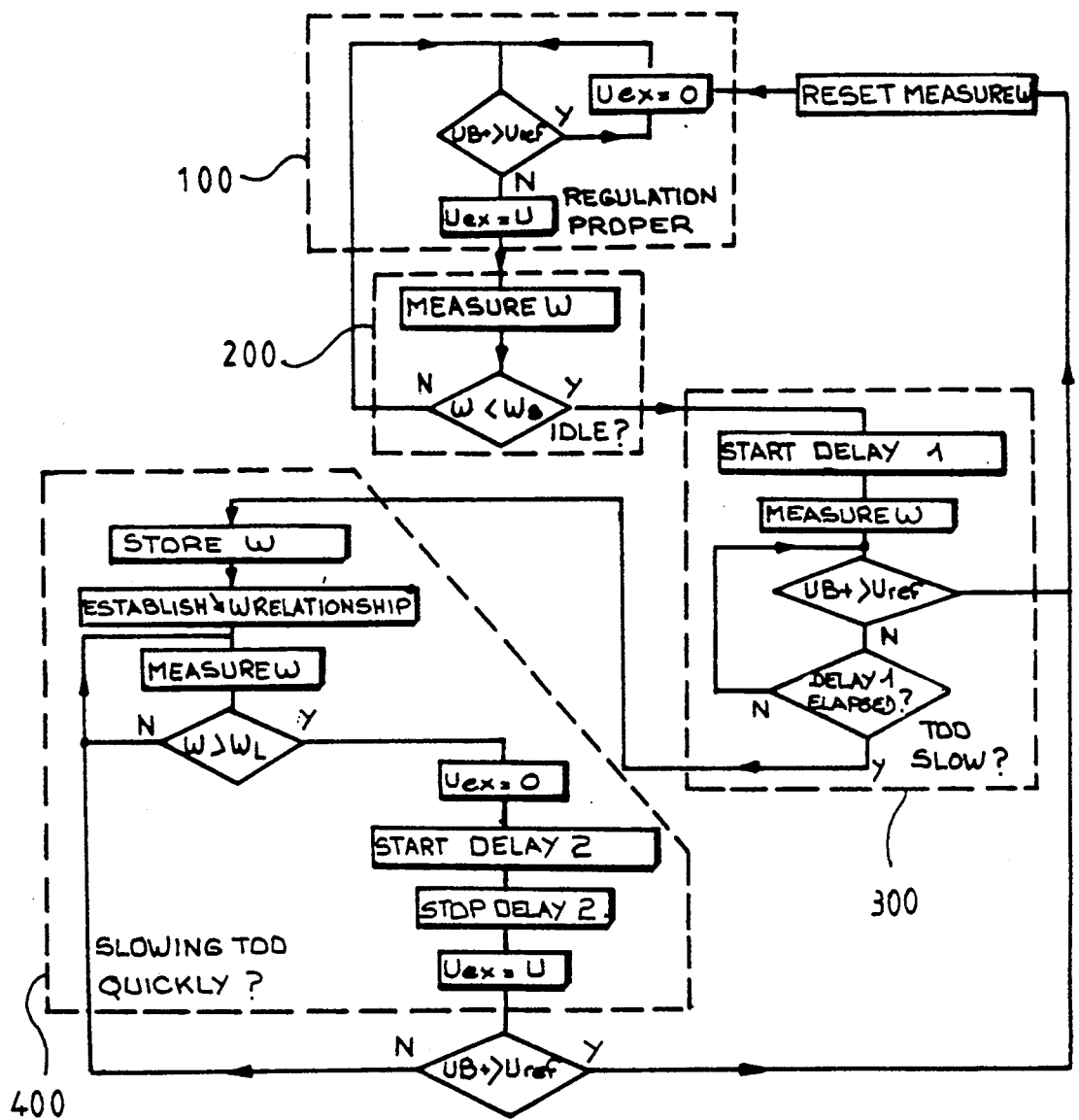
FIG. 2 is a flow chart also showing how the regulator circuit operates.

FIG. 2 is in the form of a flow chart showing the operation of a circuit that has the above-described behavior.

The top portion of the chart, given overall reference 100, constitutes the regulation proper.

Optionally, steps given overall reference 200 may be provided to ensure that the process as described above takes effect only while the speed of rotation ω of the alternator is less than a threshold speed ωs, i.e. when the engine speed comes close to its idling speed.

Portion 300 of the chart determines whether the excitation voltage is established during a time period greater than above-mentioned threshold T1, by means of a delay marked DELAY1.

Portion 400 of the chart which comes into play as soon as time delay T1 is exceeded, measures the speed ω at regular intervals and determines whether it is below or above the limit speed ωL set by the above-described relationship of admissible change, and if so, the excitation voltage Uex is forced to zero for time duration T2 by means of a time delay marked DELAY2.

This situation lasts as long as the voltage UB+ remains below the reference voltage Uref, i.e. so long as regulation ought to be under full-field conditions.

An electronic circuit suitable for implementing the present invention is now described with reference to FIG. 3.

The circuit DELAY1 designates a time delay circuit preferably implemented in the form of a digital counter. It receives a fixed-frequency clock signal Φ on a clock input CLK, which signal is generated by a suitable clock generator (not shown). It also has a count start input which receives the signal VR (see FIG. 1) which, on each transition to logic "1" level, causes the time delay to start.

For synchronization purposes, the circuit DELAY1 also receives the phase signal, written φ as conventionally provided by the alternator circuit, and after appropriate shaping.

A digital counter CT1 receives the clock signal Φ on its clock input and it receives the phase signal φ on a reset-to-zero or "clear" input, after inversion by means of a logic inverter I2.

A NOR gate P2 has a first input that receives the clock signal Φ and a second input that receives the output from the circuit DELAY1. The output from the gate P2 is applied to one input of an EXCLUSIVE NOR gate P4 whose other input receives the phase signal φ via a digital divider circuit DIV, e.g. a divideby-four circuit. The output from gate P4 is applied to the clock input CLK of another digital counter CT2.

A NOR gate P3 has a first input that receives the signal φ and a second input that receives the output from the circuit DELAY1. Its output is applied via a resistor R to the clear input CLEAR of the counter CT2. A capacitor C is also connected between said input and ground.

The parallel digital outputs from the two counters CT1 and CT2 are applied to two respective inputs of a digital comparator COMP, having an output terminal connected to a first input of another NOR gate P1. The output from the circuit DELAY1 is applied to the second input of the gate P1 via a logic inverter I1.

The output from the gate P1 is applied to another time delay circuit DELAY2 for establishing the predetermined duration T2 during which the voltage Uex is forced to zero as described above.

The operation of the FIG. 3 circuit is described below.

The time delay T1 implemented by the circuit DELAY1 is started as soon as the signal VR switches to logic level "1". If the signal VR returns to level "0" before time delay T1 has elapsed, then the output from the circuit DELAY1 remains at level "0". The output of the inverter I1 is therefore at level "1" and the output of P1 is therefore at "0" regardless of the logic level on its other input.

The purpose of the counter CT1 is continuously to measure the duration of each positive half cycle in the phase signal φ, by counting at a fixed rate as determined by the clock signal Φ between two changeovers in said phase signal φ as transmitted to CT1 via the inverter I2. The total count in CT1 is proportional to the period of said phase signal φ and is thus inversely proportional to the speed of rotation of the alternator.

In addition, so long as the output of DELAY1 is at "0", gate P3 behaves as an inverter relative to the phase signal φ. In addition, during each positive half cycle of the phase signal φ, during which CT2 is counting, the gates P2 and P4 apply the clock signal Φ to the clock input CLK of CT2. The counter CT2 then behaves like the counter CT1, but with a small shift in time due to the presence of the RC delay circuit between P3 and the clear input CLEAR of CT2.

The counter CT2 serves to store the speed of rotation of the alternator and to establish the relationship of admissible decrease in said speed as follows: when the output of DELAY1 switches to level "1", i.e. when the signal VR has remained at level "1" for a length of time that is greater than T1, the output of P3 remains at level "0" regardless of the level of the phase signal φ, thereby ensuring that CT2 is no longer reset to zero. In addition, when the output of DELAY1 switches to level "1", the output of P2 is caused to remain permanently at zero, since the clock signal Φ is no longer transmitted to CT2. The gate P4 then applies pulses to the clock input of CT2 at a period that is a multiple of the period of the phase signal φ, i.e. at a rate that is much slower than that of the clock signal Φ. The contents of CT2 which then increases regularly serves to define the relationship of acceptable increase in the period of rotation of the alternator, i.e. the relationship of admissible decrease in the speed of rotation ω.

It may be observed here that in order to ensure that said operation of slowly increasing the contents of CT2 does indeed take place from the presently measured period of rotation, it is necessary to ensure that the output from the circuit DELAY1 switches to level "1" at the end of a positive half cycle in the phase signal φ, but immediately before CT2 being reset to zero. The purpose of applying the phase signal Φ to the circuit DELAY1, and of having the RC delay circuit between P3 and CT2 is specifically to ensure that such synchronization takes place.

Once the relationship of admissible change in the period is established in CT2, the counter CT1 continues periodically to count up to a total representative of the period of rotation of the alternator. This count is permanently compared with the contents of CT2, and as soon as it exceeds the contents of CT2, the output from the comparator COMP switches over. The circuit DELAY2 is then started via gate P1 to ensure that the voltage Uex is forced to zero during the time delay T2.

As briefly mentioned above, it may be observed here that the rate at which the contents of the counter CT2 increases is proportional to the frequency of the phase signal φ. In other words, the slope of the relationship of admissible decrease in the speed of rotation is greater when the speed is itself already high. This is particularly advantageous in that such rapid decreases in the speed of rotation will be allowed when said speed is initially high, since the danger of the engine stalling or hiccuping is then small.

In contrast, when the speed of rotation is initially low, then the relationship of admissible decrease has a slope that is correspondingly lower, thereby making it possible to avoid coming close suddenly to conditions of hiccuping or stalling without leaving enough time for the regulator circuit to react.

The present invention is naturally not limited to the embodiment described above and shown in the drawings, and the person skilled in the art will be able to implement variations or modifications while remaining within the ambit of the invention.

We claim:

1. A regulator circuit for regulating the voltage delivered by an alternator for charging an associated battery, the alternator including an excitation winding and the regulator circuit controlling the current flowing through said excitation winding by switching between a first state in which excitation current increases and a second state in which excitation current decreases, said current being controlled as a function of a voltage value delivered by said alternator, wherein the circuit comprises;
   (a) detection means for determining whether the time during which the regulator circuit is in its first state is greater than a threshold time;
   (b) means for generating a speed signal representative of the speed of rotation of the alternator;
   (c) means responsive to a signal provided by the detection means to periodically compare said speed signal with a predetermined relationship establishing admissible decrease in the speed of rotation of the alternator as a function of time; and
   (d) means for temporarily switching said regulator circuit to the second state when said speed of rotation becomes less than an admissible value as determined by said relationship.

2. A circuit according to claim 1, wherein the detection means comprises time delay means.

3. A circuit according to claim 1, wherein the means for generating a speed signal representative of the speed of rotation of the alternator comprises counter means having an input that receives an alternating signal whose frequency is proportional to the speed of rotation of the alternator, said speed signal being proportional to the period of said alternating signal.

4. A circuit according to claim 3, wherein said predetermined relationship is obtained by incrementing the value of another counter means starting from a value representative of the present period of said alternating signal.

5. A circuit according to claim 4, wherein said predetermined relationship has a slope that is proportional to the speed of rotation of the alternator.

6. A method of regulating the voltage delivered by an alternator for charging an associated battery, the alternator including an excitation winding and being associated with a regulator circuit that controls the current through said excitation winding by switching between a first state during which excitation current increases and a second state during which excitation current decreases, the current being controlled as a function of a voltage value delivered by said alternator, wherein the method comprises the following steps:

(a) determining whether a length of time during which the regulator circuit has been in the first state is greater than a threshold duration;

(b) as soon as the threshold duration is exceeded, periodically generating a speed signal representative of the speed of rotation of the alternator, and then periodically comparing said speed signal with a predetermined relationship establishing an admissible decrease in the speed of rotation of the alternator as a function of time; and (c) temporarily switching said regulator circuit to its second state when the said speed of rotation becomes less than an admissible value determined by said relationship.

7. A method according to claim 6, wherein the method is implemented only when the speed of rotation of the alternator is below a predetermined threshold speed.

* * * * *